United States Patent
Case

(10) Patent No.: US 10,472,777 B1
(45) Date of Patent: Nov. 12, 2019

(54) SCREED TOW POINT ASSEMBLY FOR PAVER

(71) Applicant: Caterpillar Paving Products Inc., Brooklyn Park, MN (US)

(72) Inventor: Aaron M. Case, St. Michael, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 15/968,832

(22) Filed: May 2, 2018

(51) Int. Cl.
| | |
|---|---|
| *E01C 19/48* | (2006.01) |
| *B60D 1/145* | (2006.01) |
| *B60D 1/173* | (2006.01) |
| *E01C 19/42* | (2006.01) |

(52) U.S. Cl.
CPC .......... *E01C 19/48* (2013.01); *B60D 1/145* (2013.01); *B60D 1/173* (2013.01); *E01C 19/42* (2013.01); *E01C 19/4853* (2013.01); *E01C 2301/00* (2013.01)

(58) Field of Classification Search
CPC ...... E01C 19/42; E01C 2301/00; E01C 19/48; B60D 1/173; B60D 1/483
USPC ......................................................... 404/118
See application file for complete search history.

(56) References Cited

U.S. PATENT DOCUMENTS

| | | | | |
|---|---|---|---|---|
| 3,901,616 A | * | 8/1975 | Greening | E01C 19/4873 280/682 |
| 3,997,277 A | * | 12/1976 | Swisher, Jr. | E01C 19/4873 404/84.05 |
| 4,759,657 A | * | 7/1988 | Dorr | E01C 19/4873 404/72 |
| 4,925,340 A | * | 5/1990 | Heiser | E01C 19/004 404/118 |
| 5,344,254 A | | 9/1994 | Sartain | |
| 5,393,167 A | * | 2/1995 | Fujita | E01C 19/006 404/118 |
| 5,533,828 A | * | 7/1996 | Campbell | E01C 19/174 404/108 |
| 5,615,973 A | * | 4/1997 | Campbell | E01C 19/405 404/108 |
| 6,932,538 B2 | * | 8/2005 | Heims | E01C 19/40 404/118 |
| 8,079,776 B2 | * | 12/2011 | Lossow | E01C 19/4853 404/84.1 |
| 8,480,331 B2 | * | 7/2013 | Schmidt | E01C 19/48 404/83 |

(Continued)

FOREIGN PATENT DOCUMENTS

CN 203328648 6/2013

*Primary Examiner* — Gary S Hartmann
(74) *Attorney, Agent, or Firm* — Calfee, Halter & Griswold LLP; Jeff A. Greene

(57) ABSTRACT

A tow point assembly for attaching a screed to a traction unit of a paver, the tow point assembly including a tow arm having a forward end and a rearward end adapted to be secured to the screed, a tow point support adapted to be secured to the traction unit, and a tow point lift mechanism. The tow point lift mechanism has a first end adapted to be secured to one of the traction unit and the tow point support, and a second end connected to the forward end of the tow arm. The forward end of the tow arm defines a pull point axis where the traction unit pulls the screed and a pivot axis where the tow arm pivots relative to the traction unit. The pull point axis and the pivot axis are coaxial.

18 Claims, 4 Drawing Sheets

(56) References Cited

U.S. PATENT DOCUMENTS

| | | | |
|---|---|---|---|
| 8,696,237 B2* | 4/2014 | Hanfland | G01B 21/08 |
| | | | 404/118 |
| 8,747,022 B1 | 6/2014 | Case | |
| 9,045,871 B2* | 6/2015 | Graham | E01C 19/4873 |
| 2019/0177927 A1* | 6/2019 | Schmidt | E01C 19/48 |
| 2019/0177928 A1* | 6/2019 | Schmidt | E01C 19/48 |
| 2019/0177929 A1* | 6/2019 | Schmidt | B60G 17/005 |
| 2019/0177930 A1* | 6/2019 | Ramb | B60G 17/0165 |

* cited by examiner

SCREED TOW POINT ASSEMBLY FOR PAVER

TECHNICAL FIELD

This disclosure relates generally to pavers of the floating screed type, and more particularly to the tow point assembly used to join the floating screed and the traction unit portions of such a paver.

BACKGROUND

"Floating screed" pavers are generally known to those skilled in the art and provide a method of coating an old or new roadway with a compacted layer of paving material, such as asphalt aggregate. "Floating screed" pavers typically include a tractor having a hopper at its front end for receiving paving material and a floating screed attached to its rear end. A conveyor system on the machine transfers the paving material from the hopper rearwardly for distribution in front of a floating screed.

The screed "floats" by virtue of being connected to the tractor by pivoted tow arms such that the screed physically levels any paving material lying higher than a predetermined height above the roadway surface. The tow arms of the screed are attached to the tractor at a "tow point." In modern paver designs, the tow point can be moved vertically, typically via hydraulic cylinders, causing a corresponding movement in the leveling arms and screed. The configuration of the tow point connection between the tractor and screed can impact the degree to which the screed can "float."

In the system of U.S. Pat. No. 8,747,022 B1 to Case, the paver includes a tow point assembly having a tow arm, a tow point plate, and a tow point support for securing to a traction unit. The rearward end of the tow arm is adapted for securing to a screed assembly, and the forward end of the tow arm is coupled to the tow point plate at a pivot point. The tow point plate is slidably disposed through an opening in the tow point support with the rollers of two coupled roller assemblies disposed to roll on the forward edges of the tow point support, and rollers of a third roller assembly disposed to roll on contact with rearward edges.

SUMMARY

The disclosure describes, in one aspect, a tow point assembly for attaching a screed to a traction unit of a paver. The tow point assembly including a tow arm having a forward end and a rearward end adapted to be secured to the screed, a tow point support adapted to be secured to the traction unit, and a tow point lift mechanism. The tow point lift mechanism has a first end adapted to be secured to one of the traction unit and the tow point support, and a second end connected to the forward end of the tow arm. The forward end of the tow arm defines a pull point axis where the traction unit pulls the screed and a pivot axis where the tow arm pivots relative to the traction unit. The pull point axis and the pivot axis are coaxial.

The disclosure describes, in another aspect, a paver having a traction unit, a screed assembly, and a tow point assembly for attaching the screed assembly to the traction unit. The tow point assembly including a tow arm having a forward end and a rearward end adapted to be secured to the screed, a tow point support adapted to be secured to the traction unit, and a tow point lift mechanism. The tow point lift mechanism has a first end adapted to be secured to one of the traction unit and the tow point support, and a second end connected to the forward end of the tow arm. The forward end of the tow arm defines a pull point axis where the traction unit pulls the screed and a pivot axis where the tow arm pivots relative to the traction unit. The pull point axis and the pivot axis are coaxial.

The disclosure describes, in another aspect, a method of coupling a screed assembly to a traction unit in a paver for distributing paving material onto a roadway surface. The method includes securing a pair of tow point supports in a substantially vertical configuration to respective opposite sides of the traction unit, each tow point support including a forward edge, coupling rearward ends of a pair of tow arms to the screed assembly and disposing the tow arms on the opposite sides of the traction unit, and pivotably mounting forward ends of the pair of tow arms, relative to the traction unit, to defines a pull point axis, for each tow arm, where the traction unit pulls the screed and a pivot axis, for each tow arm, where the tow arm pivots relative to the traction unit, where the pull point axis and the pivot axis of each tow arm are coaxial.

BRIEF DESCRIPTION OF THE DRAWINGS

Further features and advantages of the invention will become apparent from the description of embodiments using the accompanying drawings. In the drawings.

DETAILED DESCRIPTION

Figure 1:
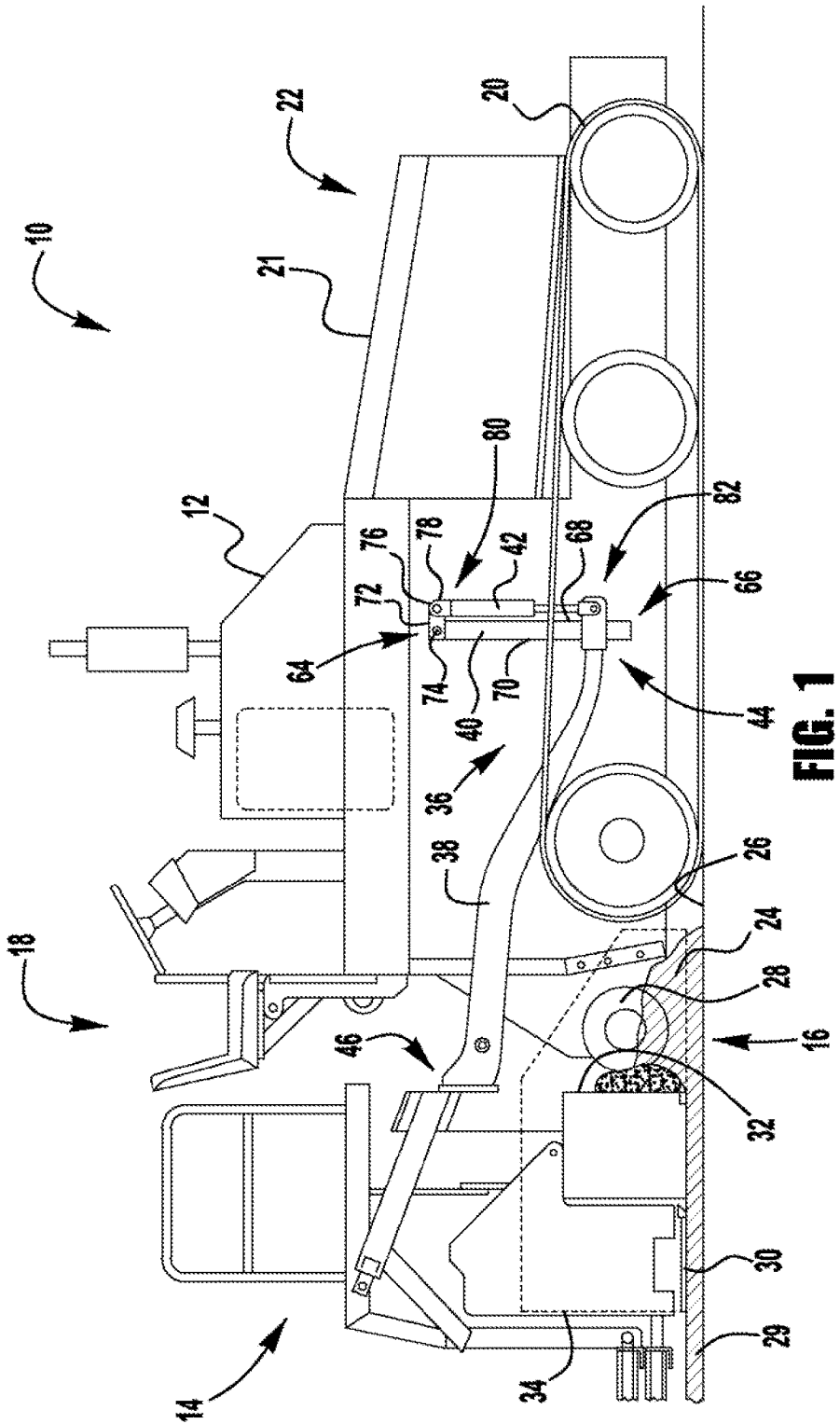
FIG. 1 is a side elevational view of an exemplary embodiment of a paver constructed in accordance with aspects of the present disclosure.

This disclosure relates to a paver having an arrangement for coupling a screed assembly to a traction unit by one or more tow arms. FIG. 1 shows a side elevational view an exemplary embodiment of a paver 10 having a traction unit 12, such as tractor, with a screed assembly 14 disposed at a rearward portion 16 of the paver 10. The traction unit 12 provides the motive force for the paver 10, and typically includes an engine (not shown), operator station 18, and ground engaging movers 20, such as tires or tracks.

The paver 10 may include a hopper 21 at a forward portion 22 of the paver 10 for storing a paving material 24, such as an asphalt material. The paver 10 may include a system for transporting the paving material 24 to the rearward portion 16 of the paver 10, such as for example, a conveyor system (not shown), typically including one or more longitudinally disposed conveyors. The paver 10 may include a system for spreading the paving material 24 out laterally on a roadway surface 26. In the illustrated embodiment, the system for spreading the paving material 24 includes one or more transverse screw augers 28 positioned at the rearward portion 16 of the paver 10 to deposit the paving material 24 onto the roadway surface 26 in front of the screed assembly 14.

The screed assembly 14 may be configured in a variety of ways. Any suitable configuration, whether known in the art or later developed, may be used. In the illustrated embodiment, the screed assembly 14 may include an arrangement for vibrating one or more elements of the screed assembly 14 to enhance distribution, leveling and compaction of the paving material 24 into a finished asphalt mat 29.

The screed assembly 14 may include a sole plate 30, a front plate 32, and an end gate 34 (shown in phantom), which are used to contain and level the deposited paving material 24 on the roadway surface 26. A thickness control (not illustrated) may be used by the operator to adjust the angle of inclination (i.e., "angle of attack") of the screed sole plate 30 in order to adjust the thickness of the resulting asphalt mat 29. The thickness control may be of any appropriate arrangement and may include, for example, a rod and bearing arrangement.

The illustrated screed assembly 14 is a floating type arrangement in which the screed assembly 14 is pivotably connected to the traction unit 12 by a first tow point assembly 36 disposed along one side of the traction unit 12 and a second tow point assembly (not shown) disclosed along the opposite side of the traction unit 12. The second tow point assembly is configured substantially similar to the first tow point assembly 36, but for being on the opposite side of the traction unit 12 and arranged in mirror image. Since, the first tow point assembly 36 is substantially similar to the second tow point assembly, only the first tow point assembly 36 will be discussed in detail below. It should be understood, however, that like elements of the first tow point assembly 36 coexist, in mirror image, in the second tow point assembly and the description of the first tow point assembly 36 applies equally to the second tow point assembly.

The first tow point assembly 36 defines a pull point axis, where the screed assembly 14 is pulled by the traction unit 12, and a pivot point axis, where the screed assembly 14 pivots relative to the traction unit 12. The first tow point assembly 36 may be configured in a variety of ways. Any configuration that axially aligns the pull point axis and the pivot point axis may be used.

In the illustrated exemplary embodiment, the first tow point assembly 36 includes a tow arm 38, a tow point support 40, and a tow point lift mechanism 42. The tow arm 38 pivotably connects the screed assembly 14 to the traction unit 12. The tow arm 38 may be configured in a variety of ways. In the illustrated embodiment, the tow arm 38 has an elongated body including a forward end 44 and a rearward end 46. The rearward end 46 is coupled to the screed assembly 14. The rearward end 46 may be coupled to the screed assembly 14 in any suitable manner. In the illustrated embodiment, the rearward end 46 include a flange 48 to facilitate fixably attaching the rearward end 46 to the screed assembly 14 by one or more fasteners (not shown).

Figure 3:
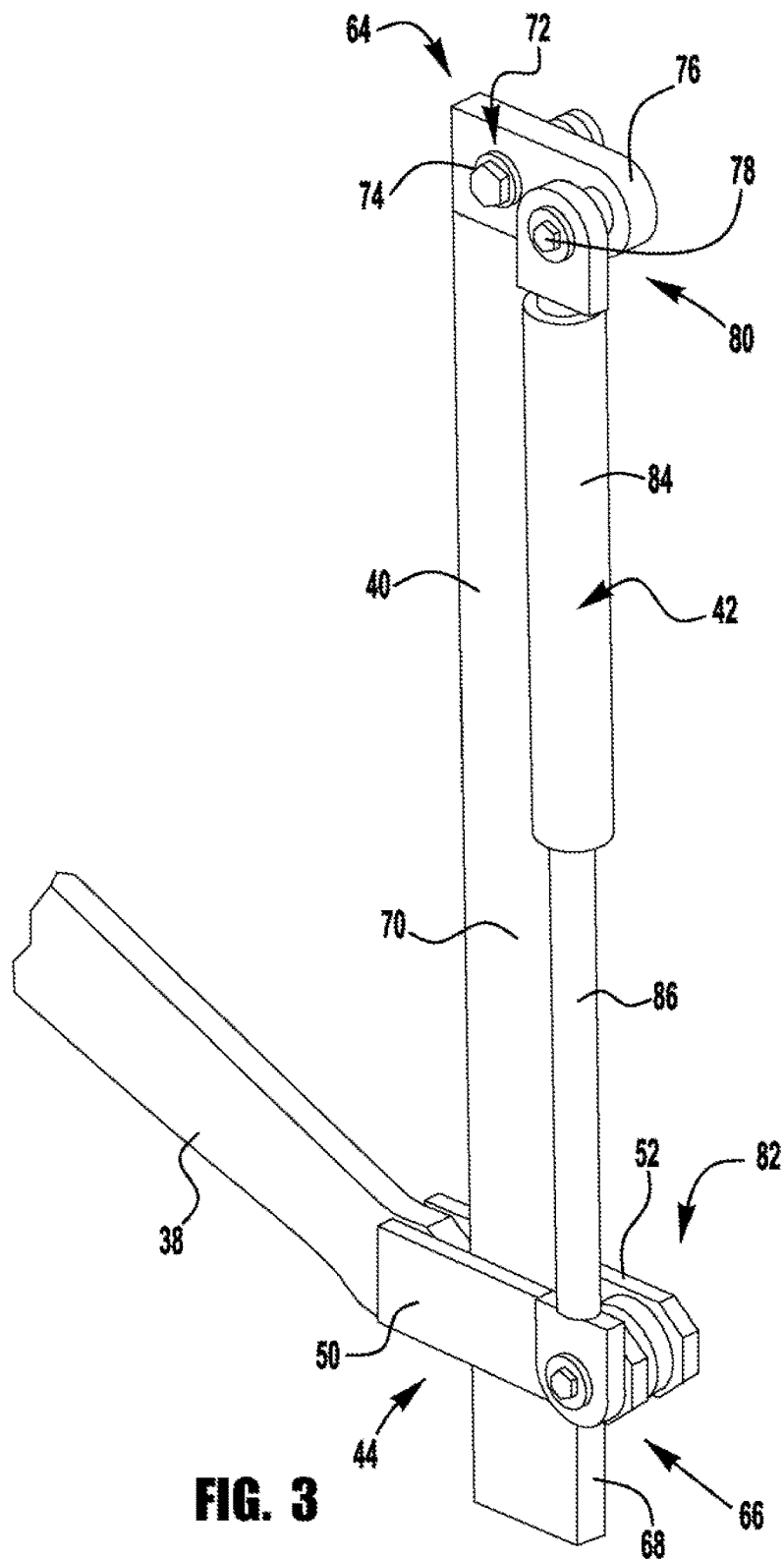
FIG. 3 shows a fragmentary isometric view of the tow point assembly of FIGS. 1-2.
Figure 4:
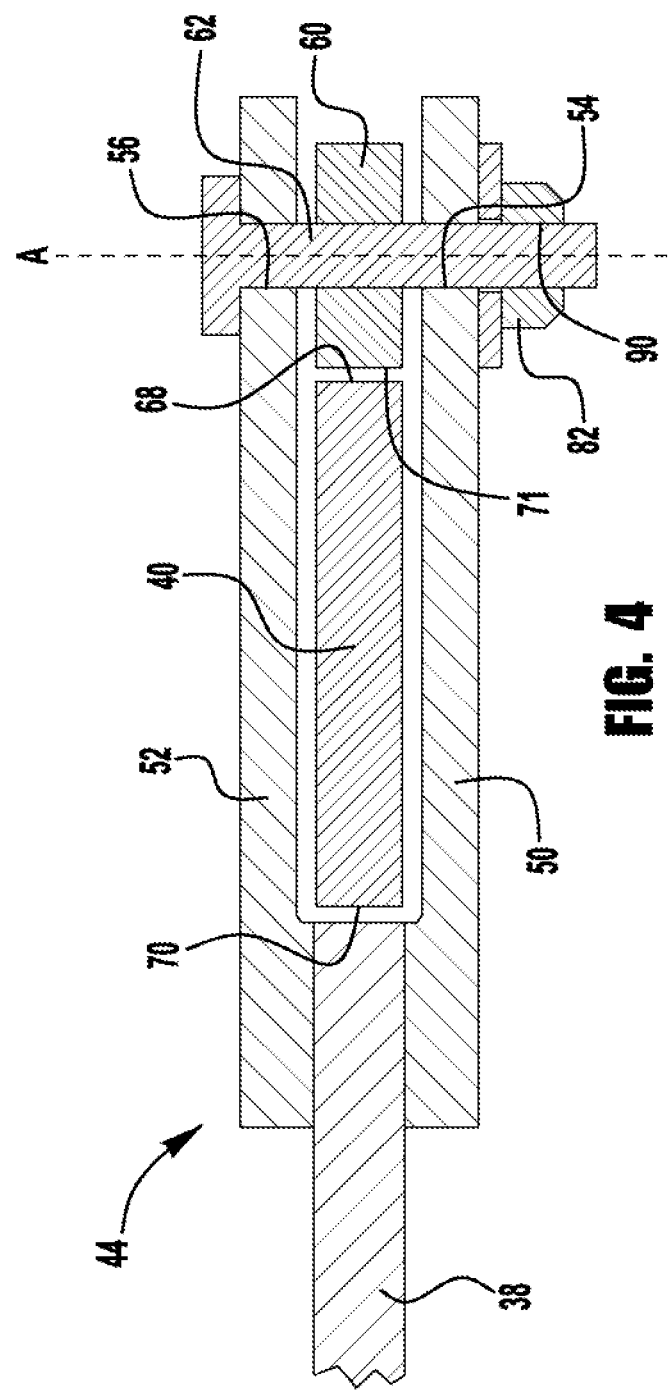
FIG. 4 is a cross-sectional view taken along line 4-4 in FIG. 3.

The forward end 44 is pivotably coupled to the traction unit 12. The forward end 44 may be configured to be pivotably coupled to the traction unit 12 in a variety of ways. Referring to FIGS. 3-4, in the illustrated embodiment, the forward end 44 is bifurcated and includes a first arm 50 and a second arm 52 spaced apart and parallel to the first arm 50. In other embodiments, however, the forward end 44 may not be bifurcated. The first arm 50 includes a first hole 54 and the second arm 52 includes a second hole 56 axially aligned with the first hole 54. A roller 60 is rotatably mounted between the first arm 50 and the second arm 52 via a shaft 62 received in the first and second holes 54, 56. The shaft 62 defines an axis A about which the roller 60 rotates. In the illustrated embodiment, the first tow point assembly 36 includes a single roller 60. In other embodiments, however, the first tow point assembly 36 may include more than one roller.

The tow point support 40 is fixably attached to, or integrally formed with, the traction unit 12. The tow point support 40 may be configured in a variety of ways. Any configuration that provides one or more surfaces that can be used to pull the screed assembly 14 may be used. In the illustrated embodiment, the tow point support 40 is an elongated member extending along a longitudinal axis B and includes a first end 64, a second end 66 opposite the first end 64, a forward edge 68, and a rear edge 70. The roller 60 includes an outer surface 71 configured to roll along the forward edge 68 of the tow point support 40.

A portion of the tow point support 40 is received between the first arm 50 and the second arm 52 of the tow arm 38. For example, the second end 66 of the tow point support 40 may be positioned between the first arm 50 and the second arm 52. In other embodiments, an intermediate portion between the first end 64 and the second end 66 may be positioned between the first arm 50 and the second arm 52.

The tow point support 40 may be fixably attached to the traction unit 12 in any suitable manner. In the illustrated embodiment, the first end 64 is fixably attached to the traction unit 12 at connection point 72 by a fastener 74. In the illustrated embodiment, the tow point support 40 also includes a boss 76 extending forward from the first end 64. The tow point lift mechanism 42 is connected to the boss 76 at connection point 78 by any suitable means, such as for example, a fastener.

The tow point lift mechanism 42 is configured to move the forward end 44 of the tow arm 38 up or down. The tow point lift mechanism 42 may be configured in a variety of ways. Any configuration capable of moving the forward end 44 of the tow arm 38 up or down may be used. In the illustrated embodiment, the tow point lift mechanism 42 has a first end 80 and a second end 82 and is configured as a hydraulic or pneumatic cylinder having a cylinder body 84 and a rod 86 axially movable relative to the cylinder body 84 in response to fluid pressure acting on the rod 86.

Figure 2:
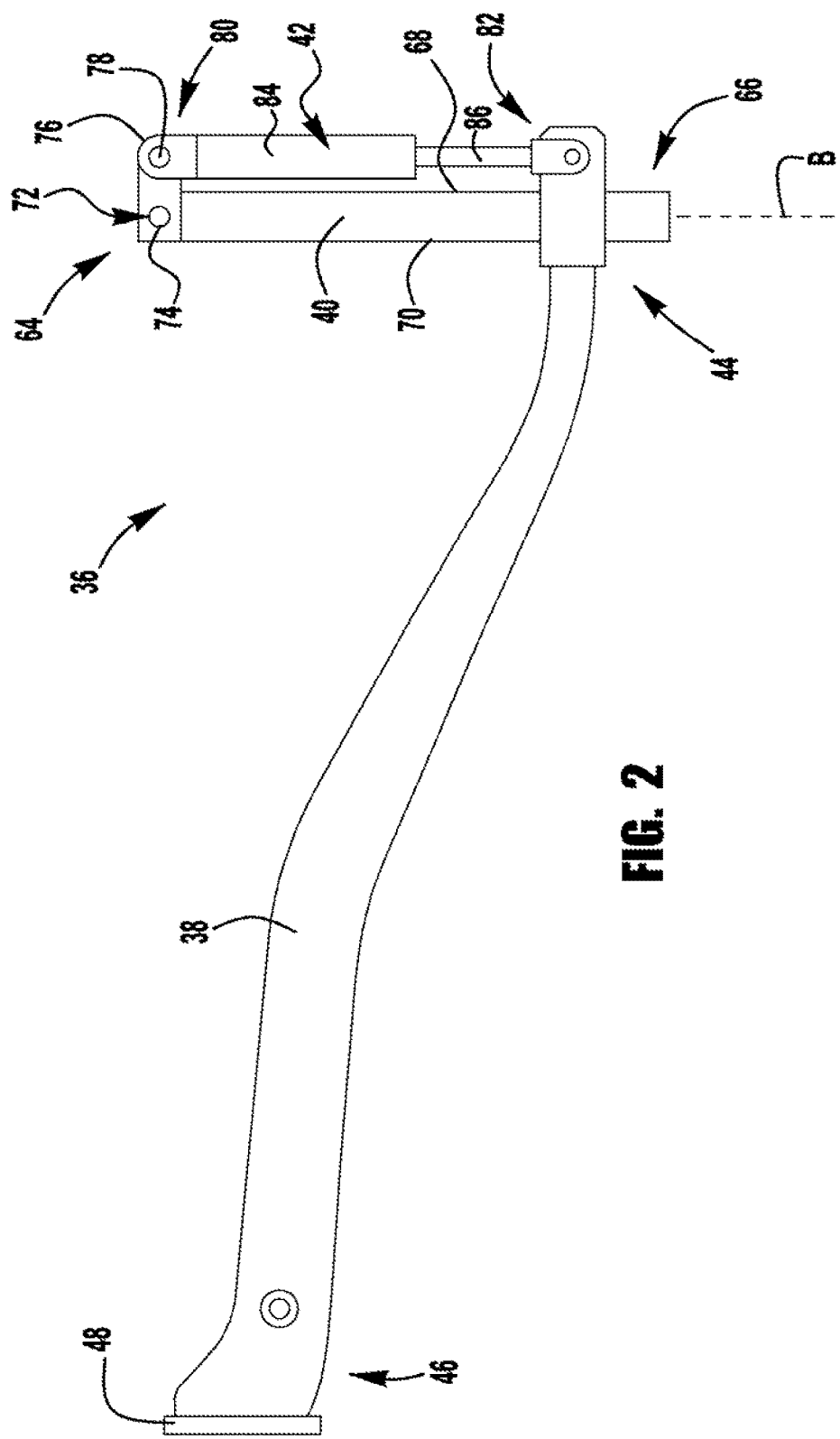
FIG. 2 is a side elevational view of an exemplary embodiment of a tow point assembly of the right side of the paver of FIG. 1.

The first end 80 may be coupled to the tow point support 40. For example, in the illustrated embodiment, the first end 80 is coupled to the boss 76 at connection point 78 via a fastener, pin, or other suitable connector. In other embodiments, however, the first end 80 may be mounted to the traction unit 12 at a different location than the tow point lift mechanism 42, such as for example, the frame of the traction unit 12. As shown in FIG. 2, in the illustrated embodiment, the tow point lift mechanism 42 is arranged parallel to, and forward of, the longitudinal axis B of the tow point support 40.

The second end 82 is pivotably coupled to the forward end 44 of the tow arm 38. The second end 82 can be pivotably coupled to the forward end 44 by any suitable means. In the illustrated embodiment, the second end 82 is mounted such that it pivots about the axis A. The second end 82 includes a mounting hole 90 configured to receive the shaft 62. Thus, the second end 82 is mounted onto the same shaft 62 as the roller 60. In other embodiments, however, the second end 82 may be mounted onto a structure different than the structure used to mount the roller 60.

INDUSTRIAL APPLICABILITY

The present disclosure is applicable to pavers 10. Embodiments of the disclosure may provide a free-floating screed assembly 14 for a paver 10. In operation, when the traction unit 12 is moving forward, the roller 60 abuts the forward edge 68 of the tow point support 40 such that the screed assembly 14 is pulled behind the traction unit 12.

Thus, the axis A, which the roller 60 is rotatably mounted to rotate about, defines a pull point axis for the screed assembly 14.

Further, as the traction unit 12 pulls the screed assembly 14, the pivotably mounted forward end 44 of the tow arm 38 allows the screed assembly 14 to "float" and follow the contour of the roadway surface 26. Since the forward end 44 is mounted to pivot about the axis A, the axis A defines a pivot point axis for the screed assembly 14.

During operation, the tow point lift mechanism 42 can move the forward end 44 of the tow arm 38, and, thus, the pull point axis, up and down. For example, grade sensors (not shown) connected to the paver 10 may send electrical signals to a control system or valve (not shown) on the traction unit 12 to cause the tow point lift mechanism 42 to retract or extend. Doing so raises or lowers the tow arm 38, and, thus, the pull point axis, vertically resulting in a corresponding movement in the tow arm 38 and screed assembly 14. In this way, the distance between screed sole plate 30 and the roadway surface 26 may be automatically fine-tuned to reflect changes in the grade of the roadway. The tow point lift mechanism 42 is mounted such that the second end 82 of the tow point lift mechanism 42 is also pivotably mounted about the axis A.

Having the pivot point axis and the pull point axis be coaxial and the tow point lift mechanism 42 pivotably mounted about the same axis, provides a compact tow point assembly design that allows the screed assembly to be free floating without any interference from the assembly.

While the disclosed embodiments have been illustrated and described in detail in the drawings and foregoing description, such illustration and description is to be considered as exemplary and not restrictive in character, it being understood that only certain exemplary embodiments have been shown and described and that all changes and modifications that come within the scope of the disclosure are desired to be protected.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A tow point assembly for attaching a screed to a traction unit of a paver, the tow point assembly comprising:
    a tow arm having a forward end and a rearward end, the rearward end adapted to be secured to the screed;
    a tow point support adapted to be secured to the traction unit; and
    a tow point lift mechanism having a first end adapted to be secured to one of the traction unit and the tow point support, and a second end connected to the forward end of the tow arm;
    wherein the forward end of the tow arm defines a pull point axis where the traction unit pulls the screed and a pivot axis where the tow arm pivots relative to the traction unit, and
    wherein the pull point axis, the second end of the tow point lift mechanism and the pivot axis are coaxial.

2. The tow point assembly of claim 1, further comprising a roller rotatably coupled to the forward end of the tow arm for rotating about the pull point axis, the roller having an exterior surface disposed to roll upon contact with the forward edge of a tow point support.

3. The tow point assembly of claim 1, where the first end of the tow point lift mechanism is attached to the tow point support.

4. The tow point assembly of claim 3, wherein the tow point support has an elongated body extending along a longitudinal axis and wherein the first end of the tow point lift mechanism is attached to the tow point support offset from the longitudinal axis.

5. The tow point assembly of claim 1, wherein the tow point lift mechanism is a hydraulic cylinder.

6. The tow point assembly of claim 5, wherein the hydraulic cylinder is arranged in parallel with the tow point support.

7. The tow point assembly of claim 1, wherein the second end of the tow point lift mechanism is connected to the forward end of the tow arm to pivot about the pivot axis.

8. The tow point assembly of claim 1 wherein the forward end of the tow arm includes a first arm and a second arm and wherein the tow point support is positioned between the first arm and the second arm.

9. The tow point assembly of claim 8, further comprising a roller rotatably mounted between the first arm and second arm for rotating about the pull point axis, the roller having an exterior surface disposed to roll upon contact with a forward edge of the tow point support.

10. A paver for distributing paving material onto a roadway surface, the paver comprising:
    a traction unit;
    a screed assembly coupled to the rear portion of the traction unit;
    a tow point assembly that couples the screed assembly to the traction unit, the tow point assembly comprising:
        a tow arm having a forward end and a rearward end, the forward end of the tow arm includes a first arm and a second arm and the rearward end adapted to be secured to the screed;
        a tow point support adapted to be secured to the traction unit, wherein the tow point support is positioned between the first arm and the second arm; and
        a tow point lift mechanism having a first end adapted to be secured to one of the traction unit and the tow point support, and a second end connected to the forward end of the tow arm;
    wherein the forward end of the tow arm defines a pull point axis where the traction unit pulls the screed and a pivot axis where the tow arm pivots relative to the traction unit, and
    wherein the pull point axis and the pivot axis are coaxial.

11. The paver of claim 10, wherein the tow point assembly further comprises:
    a second tow arm having a forward end and a rearward end, the rearward end adapted to be secured to the screed;
    a second tow point support adapted to be secured to the traction unit; and
    a second tow point lift mechanism having a first end adapted to be secured to one of the traction unit and the tow point support, and a second end connected to the forward end of the tow arm;
    wherein the forward end of the second tow arm defines a second pull point axis where the traction unit pulls the screed and a second pivot axis where the second tow arm pivots relative to the traction unit, and
    wherein the second pull point axis and the second pivot axis are coaxial.

12. The paver of claim 10, wherein the tow point assembly further comprises a roller rotatably coupled to the forward end of the tow arm for rotating about the pull point axis, the roller having an exterior surface disposed to roll upon contact with a forward edge of the tow point support.

13. The paver of claim 10, where the first end of the tow point lift mechanism is attached to the tow point support.

14. The paver of claim 13, wherein the tow point support has an elongated body extending along a longitudinal axis and wherein the first end of the tow point lift mechanism is attached to the tow point support offset from the longitudinal axis.

15. The paver of claim 10, wherein the tow point lift mechanism is a hydraulic cylinder.

16. The paver of claim 15, wherein the wherein the hydraulic cylinder is arranged in parallel with the tow point support.

17. The paver of claim 10, wherein the second end of the tow point lift mechanism is connected to the forward end of the tow arm to pivot about the pivot axis.

18. The paver of claim 10, further comprising a roller rotatably mounted between the first arm and second arm for rotating about the pull point axis, the roller having an exterior surface disposed to roll upon contact with a forward edge of the tow point support.

* * * * *